(12) United States Patent
Lee et al.

(10) Patent No.: US 12,132,172 B2
(45) Date of Patent: Oct. 29, 2024

(54) ELECTROLYTE FOR LITHIUM-METAL BATTERY HAVING IMPROVED STABILITY

(71) Applicants: HYUNDAI MOTOR COMPANY, Seoul (KR); KIA CORPORATION, Seoul (KR); ULSAN NATIONAL INSTITUTE OF SCIENCE AND TECHNOLOGY, Ulsan (KR)

(72) Inventors: Ji Yong Lee, Seongnam-si (KR); Jong Chan Song, Suwon-si (KR); Nam Soon Choi, Ulsan (KR); Won Joon Lee, Ulsan (KR); Sae Hun Kim, Ulsan (KR); Min Young Lee, Ulsan (KR); Young Joon Ahn, Ulsan (KR)

( * ) Notice: Subject to any disclaimer, the term of this patent is extended or adjusted under 35 U.S.C. 154(b) by 172 days.

(21) Appl. No.: 17/538,866

(22) Filed: Nov. 30, 2021

(65) Prior Publication Data

US 2022/0190388 A1   Jun. 16, 2022

(30) Foreign Application Priority Data

Dec. 11, 2020   (KR) .................. 10-2020-0172958

(51) Int. Cl.
| | | |
|---|---|---|
| *H01M 10/00* | (2006.01) | |
| *H01M 10/0567* | (2010.01) | |
| *H01M 10/0569* | (2010.01) | |

(52) U.S. Cl.
CPC ... *H01M 10/0569* (2013.01); *H01M 10/0567* (2013.01); *H01M 2300/0042* (2013.01); *H01M 2300/0057* (2013.01)

(58) Field of Classification Search
CPC ..... H01M 10/0569; H01M 2300/0057; H01M 2300/0042; H01M 10/0567
See application file for complete search history.

(56) References Cited

U.S. PATENT DOCUMENTS

2014/0087248 A1*   3/2014   Tachibana ......... H01M 10/0525
                                                429/188

FOREIGN PATENT DOCUMENTS

KR   10-2019-0063591   6/2019

OTHER PUBLICATIONS

Chen et al., A Lithium Ion Battery Electrolyte And Lithium Ion Battery, Feb. 2020, See the abstract. (Year: 2020).*

* cited by examiner

*Primary Examiner* — Anca Eoff
*Assistant Examiner* — Monique M Wills
(74) *Attorney, Agent, or Firm* — MCDONNELL BOEHNEN HULBERT & BERGHOFF LLP

(57) ABSTRACT

An electrolyte capable of lip roving the stability of a lithium-metal battery is provided. The electrolyte includes an organic solvent, a cosolvent, which is different from the organic solvent and includes a fluorine-based compound, and an additive having a lower lowest unoccupied molecular orbital (LUMO) value than the organic solvent.

10 Claims, 4 Drawing Sheets

US 12,132,172 B2

ELECTROLYTE FOR LITHIUM-METAL BATTERY HAVING IMPROVED STABILITY

The present application claims priority based on Korean Patent Application No. 10-2020-0172958, filed on Dec. 11, 2020, the entire content of which is incorporated herein for all purposes by this reference.

BACKGROUND OF THE DISCLOSURE

1. Technical Field

The present disclosure relates to an electrolyte capable of improving the stability of a lithium-metal battery.

2. Description of the Related Art

In order to improve the energy density of a lithium secondary battery, the energy density of a cathode and an anode must be increased. Graphite, which is used for the anode of a lithium-ion battery, currently exhibits performance close to the theoretical capacity thereof, so there is a limit to the extent to which the energy density can be further increased. Accordingly, thorough research is being conducted to develop a next-generation anode material in order to realize a lithium secondary battery having high energy density.

Lithium metal has a very high capacity per unit weight of about 3,860 mAh/g and a very low electrochemical potential (−3.040 V vs. standard hydrogen electrode), and, when used for the anode of a lithium secondary battery, lithium metal is expected to significantly improve the energy density of the battery.

However, since lithium metal has very high reactivity, the electrolyte is reduced and decomposed to form a film on the surface of the lithium metal. When a film that has deteriorated properties and is thus non-uniform and has low ionic conductivity and mechanical strength, various problems such as decreased stability due to non-uniform lithium intercalation or depletion of the electrolyte may occur.

Therefore, the development of an electrolyte material that contributes to the formation of a stable film is a key factor in the successful development of lithium-metal batteries.

SUMMARY OF THE DISCLOSURE

Therefore, an objective of the present disclosure is to provide a lithium-metal battery which operates stably at a high voltage of 4.0 V or more.

Another objective of the present disclosure is to provide a lithium-metal battery having a prolonged lifetime.

The objectives of the present disclosure are not limited to the foregoing, and will be able to be clearly understood through the following description and to be realized by the means described in the claims and combinations thereof.

An embodiment of the present disclosure provides an electrolyte including an organic solvent, a cosolvent, which is a different kind from the organic solvent and includes a fluorine-based compound, and an additive having a lower lowest unoccupied molecular orbital (LUMO) value than the organic solvent.

The organic solvent may include at least one selected from the group consisting of dimethyl ether, 1,2-dimethoxyethane, 1,3-dioxolane, diethylene glycol, tetraethylene glycol, diethylene glycol dimethyl ether, triethylene glycol dimethyl ether, tetraethylene glycol dimethyl ether, and combinations thereof.

The cosolvent may have a lower highest occupied molecular orbital (HOMO) value than the organic solvent.

The HOMO value of the cosolvent may satisfy $-11 \text{ eV} \leq \text{HOMO} \leq -7.5 \text{ eV}$.

The cosolvent may include at least one selected from the group consisting of 1,1,2,2-tetrafluoroethyl-2,2,3,3-tetrafluoropropyl ether (TTE), 1,1,2,2-tetrafluoroethyl-1H,1H,5H-octafluoropentyl ether (TFOFE), fluoroethylene carbonate (FEC), bis(2,2,2-trifluoroethyl)ether (BTFE), ethyl 4,4,4-trifluorobutyrate (ETFB), bis(2,2,2-trifluoroethyl) carbonate (TFEC), and combinations thereof.

The electrolyte may include the organic solvent and the cosolvent at a volume ratio of 5:5 to 9:1.

The LUMO value of the additive may be 1.5 eV or less.

The additive may include at least one selected from the group consisting of lithium difluorophosphate ($LiPO_2F_2$), lithium hexafluorophosphate ($LiPF_6$), lithium difluoro(oxalate)borate (LiFOB), and combinations thereof.

The electrolyte may include 0.1 wt % to 10 wt % of the additive.

The electrolyte may further include a lithium salt, which is at least one selected from the group consisting of LiFSI, LiTFSI, $LiPF_6$, $LiBF_4$, $LiSbF_6$, $LiAsF_6$, $LiN(SO_2CF_3)_2$, $LiC_4F_9SO_3$, $LiClO_4$, $LiAlO_2$, $LiAlCl_4$, LiCl, LiI, and combinations thereof.

The electrolyte may include the lithium salt at a concentration of 1.5 mol/L to 3 mol/L.

Another embodiment of the present disclosure provides a lithium-metal battery including a cathode, an anode including lithium metal, a separator, and the electrolyte described above.

The lithium-metal battery may further include a passivation layer on the anode, and the passivation layer may include a reduced decomposition product of the additive.

The reduced decomposition product may include lithium fluoride (LiF).

According to the present disclosure, a lithium-metal battery which operates stably at a high voltage of 4.0 V or more can be obtained.

In addition, according to the present disclosure, a lithium-metal battery having a prolonged lifetime can be obtained.

The effects of the present disclosure are not limited to the foregoing, and should be understood to include all effects that can be reasonably anticipated from the following description.

DESCRIPTION OF SPECIFIC EMBODIMENTS

Figure 1:
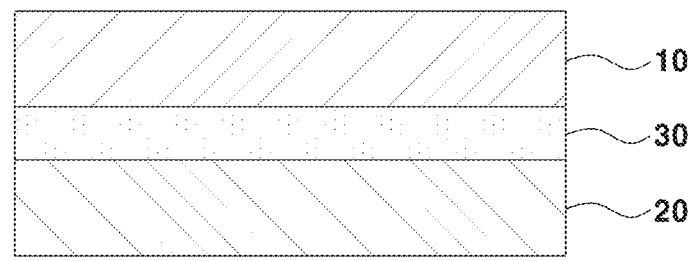
FIG. 1 shows a lithium-metal battery according to the present disclosure.

The above and other objectives/features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more ether features. Integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

FIG. 1 is a cross-sectional view showing the lithium-metal battery according to the present disclosure. The lithium-metal battery includes a cathode 10, an anode 20, a separator 30 disposed between the cathode 10 and the anode 20, and an electrolyte (not shown) incorporated in the cathode 10, the anode 20 and the separator 30.

The electrolyte includes an organic solvent, a cosolvent, an additive, and a lithium salt.

The organic solvent may include at least one selected from the group consisting of dimethyl ether, 1,2-dimethoxyethane, 1,3-dioxolane, diethylene glycol, tetraethylene glycol, diethylene glycol dimethyl ether, triethylene glycol dimethyl ether, tetraethylene glycol dimethyl ether, and combinations thereof. Specifically, the organic solvent is preferably 1,2-dimethoxyethane, which has high dissociation ability for a lithium salt and low reactivity for lithium metal.

The cosolvent is a different kind from the organic solvent, and may include a fluorine-based compound.

The cosolvent may have a lower HOMO value than the organic solvent, and specifically, the HOMO value thereof may satisfy $-11\ eV \leq HOMO \leq -7.5\ eV$. Since the HOMO value of the cosolvent is lower than that of the organic solvent, the stability of the lithium-metal battery at a high voltage is improved.

The cosolvent nay include at least one selected from the group consisting of 1,1,2,2-tetrafluoroethyl-2,2,3,3-tetrafluoropropyl ether (TTE), 1,1,2,2-tetrafluoroethyl-1H,1H,5H-octafluoropentyl ether (TFOFE), fluoroethylene carbonate (FEC), bis(2,2,2-trifluoroethyl)ether (BTFE), ethyl 4,4,4-trifluorobutyrate (ETFB), bis(2,2,2-trifluoroethyl) carbonate (TFEC), and combinations thereof.

The electrolyte may include the organic solvent and the cosolvent at a volume ratio of 5:5 to 9:1. If the volume ratio is less than the above lower limit of 5:5, the amount of the cosolvent including the fluorine-based compound may be lowered, so the passivation layer of the fluorine component may not be sufficiently formed on the surface of the anode, which is lithium metal. On the other hand, if the volume ratio exceeds the above upper limit of 9:1, the passivation layer may be excessively thick, so intercalation overvoltage may increase, and accordingly, the lifetime of the battery may decrease.

The additive is used to form a stable passivation layer on the surface of the lithium metal, which is the anode, and the formation of dendritic lithium may be suppressed by the passivation layer that is formed.

The additive may have a lower LUMO (lowest unoccupied molecular orbital) value than the organic solvent. Specifically, the LUMO value of the additive may be 1.5 eV or less. The lower limit of the LUMO value of the additive is not particularly limited, but may be, for example, 0.5 eV or mere, 0 eV or mere, or $-0.5$ eV or more. Since the LUMO value of the additive is lower than that of the organic solvent, the additive nay be preferentially reduced on the surface of the lithium metal to form a passivation layer. Moreover, additional decomposition of the organic solvent may be suppressed by the passivation layer that is formed.

The additive may include at least one selected from the group consisting of lithium difluorophosphate ($LiPO_2F_2$), lithium hexafluorophosphate ($LiPF_6$), lithium difluoro(oxalate)borate (LiFOB), and combinations thereof.

The electrolyte may include 0.1 wt % to 10 wt % of the additive. If the amount of the additive is less than the above lower limit, the passivation layer cannot be sufficiently formed, so the desired effect cannot be obtained. On the other hand, if the amount thereof exceeds the above upper limit, the passivation layer may be formed to be excessively thick, so the internal resistance of the battery may increase.

The lithium salt may include least one selected from the group consisting of LiFSI, LiTFSI, $LiPF_6$, $LiBF_4$, $LiSbF_6$, $LiAsF_6$, $LiN(SO_2CF_3)_2$, $LiC_4F_9SO_3$, $LiClO_4$, $LiAlO_2$, $LiAlCl_4$, LiCl, LiI, and combinations thereof.

The electrolyte may include the lithium salt at a concentration of 1.5 mol/L to 3 mol/L. If the concentration of the lithium salt is less than the above lower limit, the reversibility of lithium metal may decrease, and a free solvent that does not solvate with lithium ions may be generated, and thus side reactions may occur on the surface of the lithium metal. Also, the decomposition product generated by the side reactions may continuously accumulate, so the rate of utilization of lithium may decrease. On the other hand, if the concentration of the lithium salt exceeds the above upper limit, the viscosity of the electrolyte nay increase, so the battery resistance may increase and the power output characteristics of the battery may deteriorate.

The cathode 10 may include a cathode active material, a binder, and a conductive material.

The cathode active material may include at least one selected from the group consisting of $LiCo_2$, $LiNiCoMnO_2$, $LiNiCoAlO_2$, $LiMn_2O_4$, $LiFeO_4$, and combinations thereof. However, the type of cathode active material is not limited thereto, and any cathode active material may be further included, so long as it is commonly used in the art to which the present disclosure belongs.

The binder is used to attach particles of the cathode active material. Examples of the binder may include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, ethylene-oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like.

The conductive material is used to impart conductivity to the cathode 10. The conductive material nay be used without particular limitation, so long as it is able to conduct electrons without causing chemical changes in the cathode 10. Examples of the conductive material may include natural graphite, synthetic graphite, carbon black, carbon fiber, metal powder, metal fiber, and the like, in which the metal of the metal powder or the metal fiber is exemplified by copper, nickel, aluminum, silver, etc. Farther, the binder may include a conductive material such as a polyphenylene derivative, etc.

The anode 20 may include lithium metal or a lithium metal alloy.

The lithium metal alloy may include an alloy of lithium and at least one metal selected from the group consisting of Na, K, Rb, Cs, Fr, Be, Mg, Ca, Sr, Si, Sb, Pb, In, Zn, Ba, Ra, Ge, Al, Sn, and combinations thereof.

The separator 30 may include at least one selected from the group consisting of polyethylene, polypropylene, polyvinylidene fluoride, and combinations thereof. Also, the separator may be provided in the form of a multilayer film of two or more layers.

A passivation layer (not shown) may be formed on the surface of the anode 20. For example, according to the present disclosure, a lithium-metal battery may be manufactured using the electrolyte including the organic solvent, the cosolvent, the additive and the lithium salt as described above, followed by a formation charge/discharge process, whereby a passivation layer may result from the cosolvent and the additive on the surface of the anode 20.

The passivation layer may function to improve oxidation stability of the lithium-metal battery at a high voltage, suppress the growth of dendritic lithium, and stabilize the interface between the anode 20 and the separator 30.

The passivation layer may include, but is not limited to, lithium fluoride (LiF), etc.

A better understanding of the present disclosure may be obtained through the following examples. These examples are merely set forth to illustrate the present disclosure, and are not to be construed as limiting the scope of the present disclosure.

Preparation Example 1,2-dimethoxyethane as an organic solvent was mixed with 1,1,2,2-tetrafluoroethyl-1H,1H,5H-octafluoropentyl ether (TFOFE) as a cosolvent at a volume ratio of 8:2. Then, 2.5 M LiFSI as a lithium salt and 0.3 wt % of lithium difluorophosphate ($LiPO_2F_2$) as an additive were added thereto, thereby preparing an electrolyte.

Comparative Preparation Example

An electrolyte was prepared in the same manner as in Preparation Example above, with the exception that the additive was not added.

Example 1

Li/Cu Half-Cell

An anode was manufactured by rolling lithium metal having a thickness of about 100 μm on a copper foil current collector. A copper foil having a thickness of about 20 μm was used as a cathode, and a polyethylene separator was interposed between the anode and the cathode to afford a laminate. About 40 μl of the electrolyte of Preparation Example was injected into the laminate. The laminate was pressed, thereby manufacturing a coin-type 2032 cell as a lithium-metal battery.

Example 2

Li/Li Symmetric Cell

A lithium-metal battery was manufactured in the same manner as in Example 1, with the exception that lithium metal having a thickness of about 100 μm was used as the cathode.

Example 3

Li/NMC Full Cell

A lithium-natal battery was manufactured in the same manner as in Example 1, with the exception that the anode was manufactured by rolling lithium metal having a thickness of about 45 μm on a copper foil current collector, and a cathode including $LiNiCoMnO_2$ as a cathode active material was manufactured.

Comparative Example 1

A lithium-metal battery was manufactured in the same manner as in Example 1, with the exception that the electrolyte of Comparative Preparation Example was used.

Comparative Example 2

A lithium-metal battery was manufactured in the same manner as in Example 2, with the exception that the electrolyte of Comparative Preparation Example was used.

Comparative Example 3

A lithium-metal battery was manufactured in the same manner as in Example 3, with the exception that the electrolyte of Comparative Preparation Example was used.

Test Example 1

The intercalation/deintercalation efficiency of the lithium-metal battery of each of Example 1 and Comparative Example 1 was evaluated based on the following criteria. The results thereof are shown in Table 1 below.

Intercalation/deintercalation efficiency: The evaluation conditions were a current density of 0.5 mA/cm² and an energy density of 5 mAh/cm².

The lifetime of the lithium-metal battery of each of Example 2 and Comparative Example 2 was evaluated based on the following criteria. The results thereof are shown in Table 1 below and in FIGS. 2A and 2B.

Lifetime evaluation: In the formation process, charging and discharging were performed once at a current density of 0.5 mA/cm² and an energy density of 5 mAh/cm² and were then performed three times at a current density of 1.0 mA/cm² and an energy density of 5 mAh/cm². Thereafter, charging and discharging were performed at a current density of 2.0 mA/cm² and an energy density of 5 mAh/cm² by the present procedure. The lifetime was considered to be the time until capacity retention dropped to 80% of the initial capacity.

The lifetime of the lithium-metal battery of each of Example 3 and Comparative Example 3 was evaluated based on the following criteria. The results thereof are shown in Table 1 below and in FIGS. 3A and 3B.

Lifetime evaluation: The lithium-metal battery was charged and discharged three times at 0.1 C in the formation process. Thereafter, charging and discharging were performed at a current density of 0.5 mA/cm², an electrode-loading amount of 26.6 mg/cm², and a cut-off voltage of 3.0 to 4.2 V by the present procedure. The lifetime was considered to be the time until capacity retention dropped to 80% of the initial capacity.

TABLE 1

| | | |
|---|---|---|
| Li/Cu half-cell | Example 1 | 91.4% |
| Intercalation/deintercalation efficiency [%] | Comparative Example 1 | 76.0% |
| Li/Li symmetric cell | Example 2 | 114 cycles |
| Lifetime evaluation [cycle number] | Comparative Example 2 | 94 cycles |
| Li/NMC full cell | Example 3 | 150 cycles |
| Lifetime evaluation [cycle number] | Comparative Example 3 | 92 cycles |

As is apparent from Table 1, the Li/Cu half-cell of Example 1 exhibited intercalation/deintercalation efficiency of 91.4%. Moreover, the average efficiency thereof was 99.0%. Therefore, in the lithium-metal battery of Example 1, a stable passivation layer was initially formed on the surface of the lithium metal, and the passivation layer was not broken but was stably maintained even during repeated lithium intercalation and deintercalation.

Figure 2A:
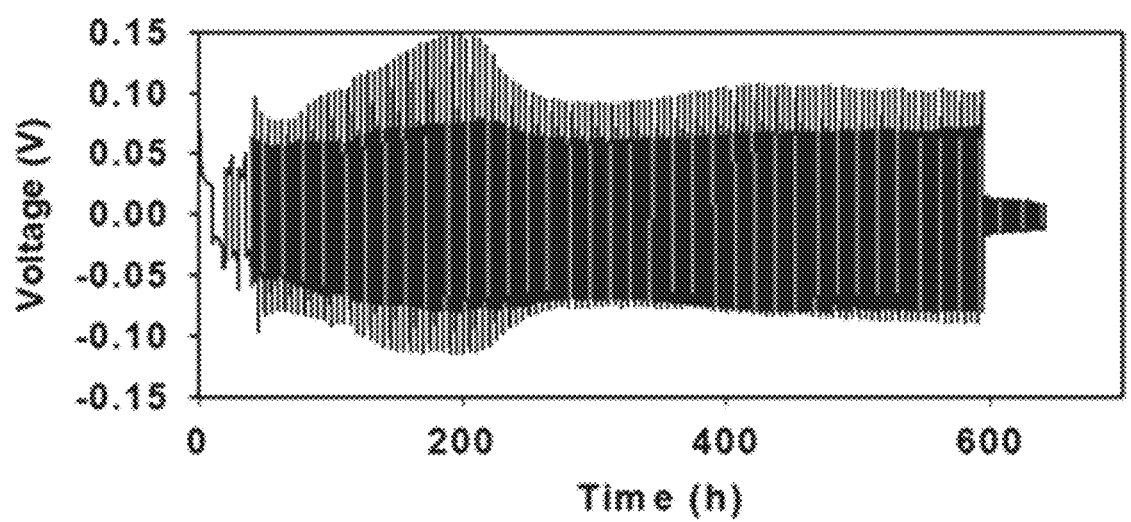
FIG. 2A shows the results of measurement of the lifetime of the lithium-metal battery of Example 2.
Figure 2B:
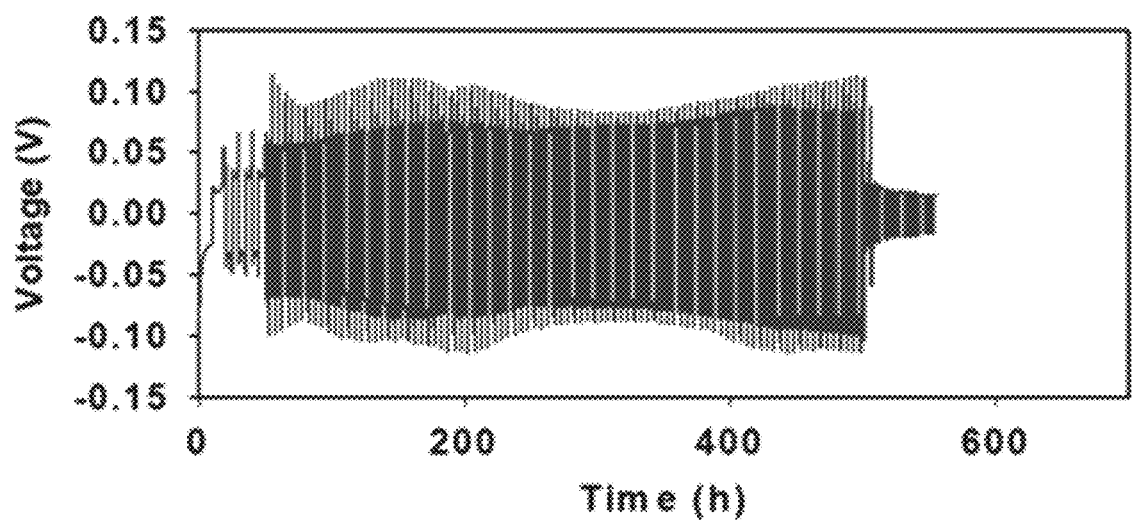
FIG. 2B shows the results of measurement of the lifetime of the lithium-metal battery of Comparative Example 2.

As is apparent from Table 1 and FIG. 2A, the Li/Li symmetric cell of Example 2 had a lifetime of 114 cycles. In particular, as shown in FIG. 2A, a stable cycle system resulted at an overvoltage less than 100 mV. Therefore, it can be concluded that the lithium-metal battery of Example 2 included a stable passivation layer formed on the surface of lithium metal, thereby prolonging the lifetime thereof.

Figure 3A:
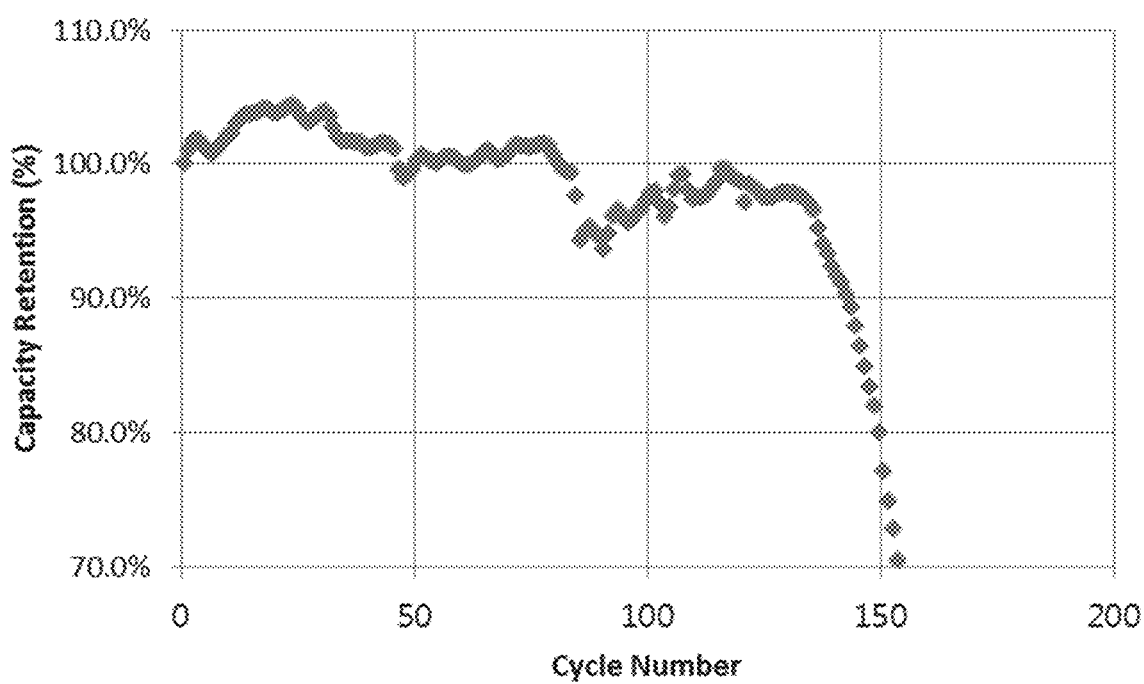
FIG. 3A shows the results of measurement of the lifetime of the lithium-metal battery of Example 3.
Figure 3B:
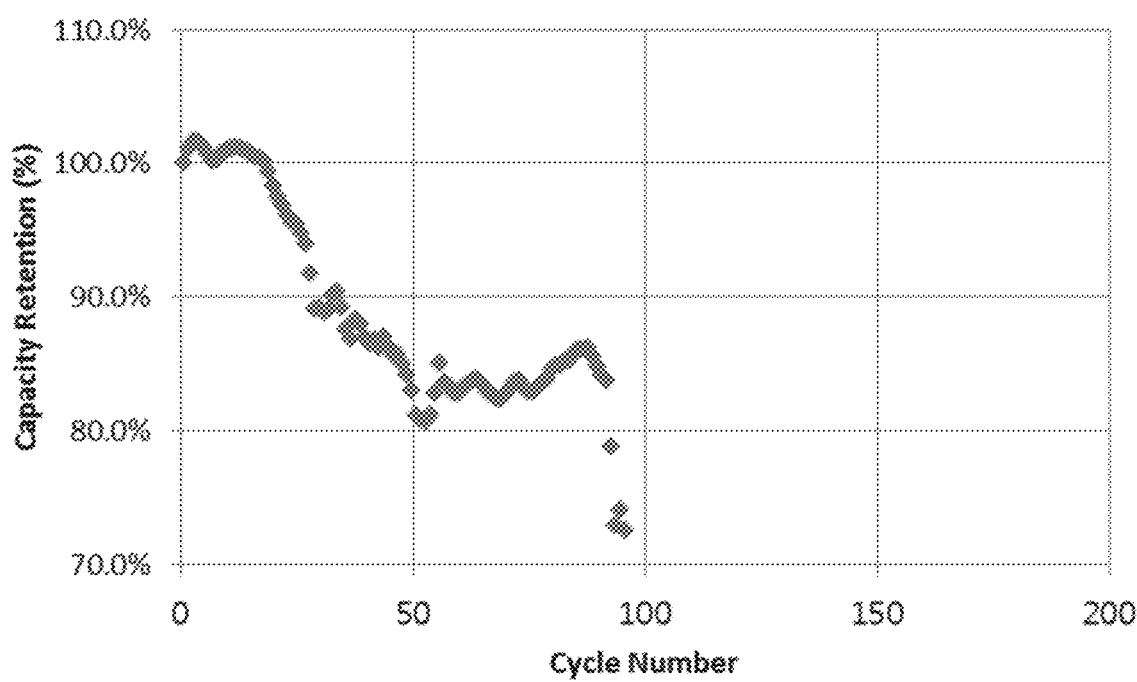
FIG. 3B shows the results of measurement of the lifetime of the lithium-metal battery of Comparative Example 3.

As is apparent from Table 1 and FIG. 3A, the Li/NMC full cell of Example 3 had a lifetime of 150 cycles, which is evaluated to be very long compared to Comparative Example 3 of FIG. 3B.

Test Example 2

The lithium-metal battery of each of Example 3 and Comparative Example 3 was analyzed through linear sweep voltammetry (LSV) to evaluate stability at a high voltage. The control that was used was a lithium-metal battery using an electrolyte not including a cosolvent and an additive. The results thereof are shown in FIG. 4.

Figure 4:
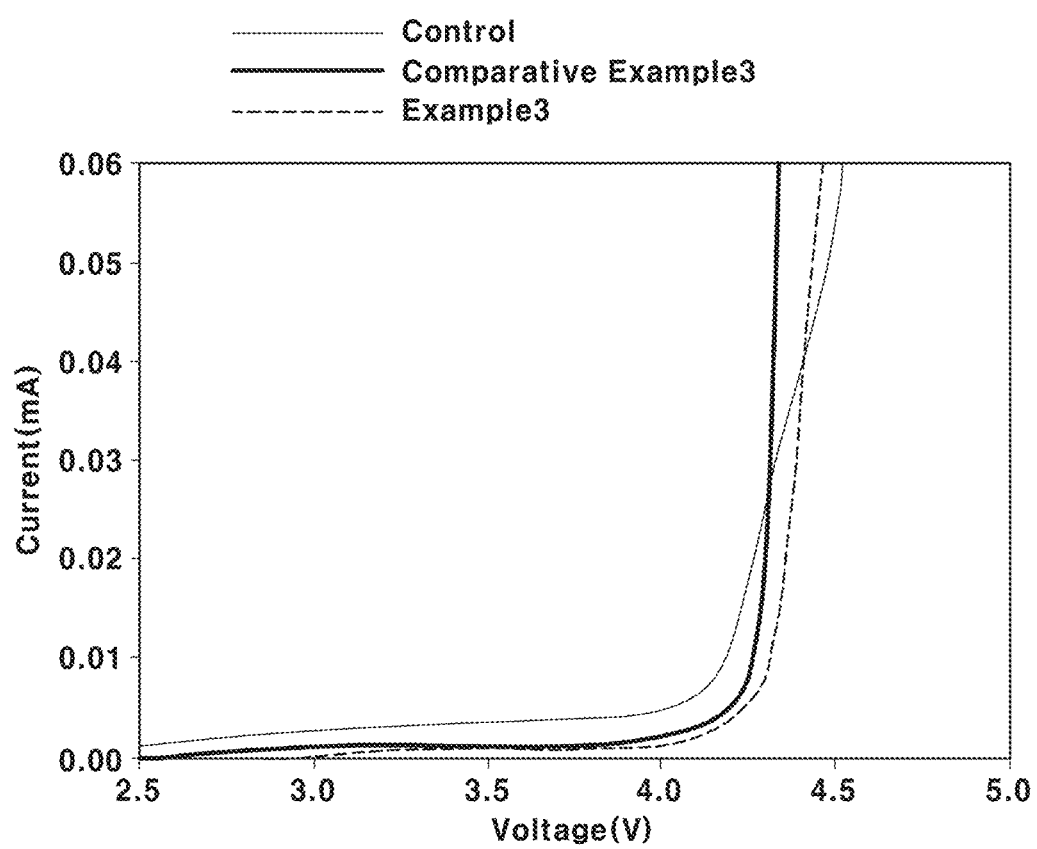
FIG. 4 shows the results of linear sweep voltammetry (LSV) of the lithium-metal battery of each of Example 3 and Comparative Example 3.

With reference to FIG. 4, onset points appeared at increasingly higher voltages in the control, Comparative Example 3 and Example 3. Therefore, it can be concluded that the lithium-metal battery of Example 3 exhibited high oxidation stability at a high potential of 4.0 V or more.

The test examples and examples of the present disclosure have been described in detail above but the scope of the present invention is not limited to the test examples and examples described above. Various modifications and improvements capable of being devised by those skilled in the art using the basic concept of the present disclosure defined in the following claims also fall within the scope of the present disclosure.

What is claimed is:

1. An electrolyte, comprising:
   an organic solvent;
   a cosolvent, wherein the cosolvent is different from the organic solvent and comprises a fluorine-based compound; and
   an additive having a lower lowest unoccupied molecular orbital (LUMO) value than the organic solvent,
   wherein the additive comprises difluorophosphate ($LiPO_2F_2$),
   wherein the organic solvent comprises 1,2-dimethoxyethane,
   wherein the cosolvent comprises 1,1,2,2-tetraflouroethyl-1H, 1H,5H-octafluoropentyl ether (TFOFE), and
   wherein a volume ratio of the organic solvent and the cosolvent is 5:5 to 9:1.

2. The electrolyte of claim 1, wherein the cosolvent has a lower HOMO (highest occupied molecular orbital) value than the organic solvent.

3. The electrolyte of claim 1, wherein a HOMO value of the cosolvent satisfies $-11$ eV $\leq$ HOMO $\leq -7.5$ eV.

4. The electrolyte of claim 1, wherein the additive has a LUMO value of 1.5 eV or less.

5. The electrolyte of claim 1, wherein an amount of the additive is 0.1 wt % to 10 wt %.

6. The electrolyte of claim 1, further comprising a lithium salt, comprising at least one selected from the group consisting of $LiFSI$, $LiTFSI$, $LiPF_6$, $LiBF_4$, $LiSbF_6$, $LiAsF_6$, $LiC_4F_9SO_3$, $LiClO_4$, $LiAlO_2$, $LiAlCl_4$, $LiCl$, $LiI$, and combinations thereof.

7. The electrolyte of claim 6, wherein a concentration of the lithium salt is 1.5 mol/L to 3 mol/L.

8. A lithium-metal battery, comprising:
   a cathode;
   an anode comprising lithium metal;
   a separator; and
   the electrolyte of claim 1.

9. The lithium-metal battery of claim 8, further comprising a passivation layer on the anode, in which the passivation layer comprises a reduced decomposition product of an additive.

10. The lithium-metal battery of claim 9, wherein the reduced decomposition product comprises lithium fluoride (LiF).

* * * * *